US008804927B2

(12) United States Patent
Weng

(10) Patent No.: US 8,804,927 B2
(45) Date of Patent: Aug. 12, 2014

(54) COMPUTER INTEGRATED WITH UNIVERSAL TELEPHONE FUNCTIONS

(76) Inventor: Yinsong Weng, Shenzhen (CN)

( * ) Notice: Subject to any disclaimer, the term of this patent is extended or adjusted under 35 U.S.C. 154(b) by 91 days.

(21) Appl. No.: 13/320,273

(22) PCT Filed: May 12, 2010

(86) PCT No.: PCT/CN2010/072649

§ 371 (c)(1), (2), (4) Date: Nov. 14, 2011

(87) PCT Pub. No.: WO2010/130201

PCT Pub. Date: Nov. 18, 2010

(65) Prior Publication Data

US 2012/0063578 A1 Mar. 15, 2012

(30) Foreign Application Priority Data

May 14, 2009 (CN) .......................... 2009 1 0107285

(51) Int. Cl.
*H04M 11/00* (2006.01)

(52) U.S. Cl.
USPC .................. 379/93.09; 379/93.05; 379/93.07; 379/93.11; 379/100.12

(58) Field of Classification Search
USPC .......... 379/90.01, 93.04, 93.05, 93.06, 93.07, 379/93.09, 93.11, 93.17, 93.19, 93.28, 379/110.01, 419, 100.12
See application file for complete search history.

(56) References Cited

U.S. PATENT DOCUMENTS

| | | | | |
|---|---|---|---|---|
| 6,018,571 | A * | 1/2000 | Langlois et al. | 379/201.04 |
| 6,983,042 | B1 * | 1/2006 | Chapman et al. | 379/201.02 |
| 7,069,365 | B2 * | 6/2006 | Zatorski | 710/200 |
| 7,440,556 | B2 * | 10/2008 | Bear et al. | 379/90.01 |
| 7,675,904 | B2 * | 3/2010 | Chou et al. | 370/352 |
| 7,678,922 | B2 * | 3/2010 | Almstead et al. | 548/131 |
| 2004/0047358 | A1 * | 3/2004 | Chen et al. | 370/401 |
| 2005/0089052 | A1 * | 4/2005 | Chen et al. | 370/401 |
| 2006/0179476 | A1 * | 8/2006 | Challener et al. | 726/4 |
| 2008/0025484 | A1 * | 1/2008 | Liu et al. | 379/93.05 |
| 2008/0043974 | A1 * | 2/2008 | Chen | 379/219 |
| 2009/0036159 | A1 * | 2/2009 | Chen | 455/556.1 |

FOREIGN PATENT DOCUMENTS

CN 101393469 A 3/2009

OTHER PUBLICATIONS

International Search Report of PCT/CN2010/072649, (Aug. 26, 2010).

* cited by examiner

*Primary Examiner* — Binh Tieu
(74) *Attorney, Agent, or Firm* — Global IP Services; Tianhua Gu

(57) ABSTRACT

A computer integrated with universal telephone functions, includes a normal computer and system thereof. The computer is integrated with a public switched telephone network (PSTN) telephone interface and communication functions thereof, the PSTN telephone, a voice over Internet protocol (VoIP) telephone, wireless communication, faxes and the computer are integrated in the computer system, a user simply needs a terminal (telephone handle/mobile telephone), to use the PSTN and the network telephone conveniently.

11 Claims, 2 Drawing Sheets

PSTN
101
Internet
102
106
100

COMPUTER INTEGRATED WITH UNIVERSAL TELEPHONE FUNCTIONS

FIELD OF THE INVENTION

The present invention relates to hardware, software and interface technology of micro computer, and relates to telephone and network communication technology.

BACKGROUND OF THE INVENTION

Public voice communication technology has undergone a considerable development since Bell has invented the telephone. Now there are two major public voice communication technologies, one of which is a normal telephone that is a circuit-switched wired public telephone network (such as PSTN, ISDN and so on) or a wireless telephone network that is the most traditional fixed telephone or wireless telephone, and the other is the recently rapidly developing network telephone based on the packet switching technology that is VoIP telephone. The two telephone technologies have their advantages and disadvantages respectively, wherein, the PSTN and the wireless telephone have clear voice, and they can provide the most comprehensive range of services, such as a variety of public services telephones, emergency calls, dialing a call without commercial power; however costs are usually high especially for cross-regional and cross-border long distance calls. While calling costs may be substantially reduced when the VoIP telephone using free internet technology is utilized, especially the network terminal-to-network terminal calls are usually free. However, because of the inherent delay defect of the packet switching technology to which the voice communication is sensitive, the voice quality may be reduced inevitably. Moreover, the VoIP telephone generally can not provide emergency calls and people can not dial a call without commercial power. With the increasing popularity of computer, the personal computer has become a necessary equipment of many families or person. Meanwhile, in most cases, a PSTN phone will also be equipped which usually may take up the additional desktop space.

SUMMARY

On account of the various advantages and disadvantages mentioned above, the present invention provides a computer system integrated with both the normal telephone and network telephone.

According to one aspect, a computer integrated with universal telephone functions is provided, which comprising a normal computer body and a system thereof, the normal computer is integrated with a universal PSTN telephone interface and communication functions thereof.

Advantageously, the computer further comprises a telephone handle with a key and a telephone interface module, a PSTN telephone is available when the computer is powered off or without commercial power supply.

Advantageously, the computer further comprises a digital wireless transceiver module and one or more mobile phones to constitute a cordless telephone communication system, wherein the digital wireless transceiver module is based on Bluetooth, 802.11, 802.16 or other digital wireless communication standards.

Advantageously, through a mobile phone with a touch display screen, the touch display screen is used as a wireless mouse and/or a tablet input, and as a second display screen of the computer.

Advantageously, the computer further comprises a control software to implement the computer software telephone functions of making a PSTN telephone and an automatic telephone answering and recording by the computer display screen and/or keyboard and/or mouse.

Advantageously, the computer further comprises a control software and a digital control circuit to use function of the network telephone and switch between the network telephone and the PSTN telephone functions freely while implementing the above mentioned three telephone communication modes, that is, a telephone handle, a cordless telephone and a computer software telephone.

Advantageously, a call from the network interface and a call from the PSTN telephone interface can switch automatically between each other through setting the control software.

Advantageously, receiving and transmitting a fax can be implemented by the network and/or PSTN telephone line through the control software.

Advantageously, an internet chat with or without a video can be implemented by the network interface, the telephone handle, the cordless telephone and a camera set thereon, so as to make the internet chat more in line with the usual calling habit, wherein, MSN, QQ and other internet chat tools are supported.

Advantageously, the system involves a desktop computer, a laptop and other simple personal computers.

The present invention also provides a computer integrated with universal telephone functions, wherein, comprising a computer body with a computer control unit, and a network telephone access unit connected with the computer control unit, wherein, the computer further comprises a normal telephone access unit, an audio input and output unit and a digital control unit; the normal telephone access unit and the digital control unit are connected with the computer control unit; the normal telephone access unit comprises a telephone interface and a telephone interface module between the digital control unit and the telephone interface; the digital control unit is connected with the network telephone access unit, the normal telephone access unit and the audio input and output unit respectively, and is used for managing and switching the network telephone access unit and the normal telephone access unit, and is used for processing signals from the network telephone access unit or the normal telephone access unit and transmitting processed audio signals to the audio input and output unit, and is used for processing signals from the audio input and output unit and transmitting processed audio signals to the network telephone access unit or the normal telephone access unit; the digital control unit is configured for transmitting the audio signals from the network telephone access unit to the normal telephone access unit, and vice versa for the switching between the network telephone access unit and the normal telephone access unit.

By the present invention, a telephone landline is eliminated, less desktop space is taken up and the telephone usage of users is simplified. The users can enjoy both the practical of the normal telephone and the cheap of the network telephone only by one terminal (a telephone handle or a mobile phone). By a variety of combinations, many interesting and useful functions can be derived, all of which is integrated in one computer system.

BRIEF DESCRIPTION OF THE DRAWINGS

The present invention is described with reference to the accompanying drawings.

| | | | |
|---|---|---|---|
| computer body | 100 | PSTN telephone interface | 101 |
| internet network interface | 102 | telephone interface module | 103 |
| computer network card | 104 | computer sound card | 105 |
| telephone handle | 106 | digital control circuit | 110 |
| PCM module | 121 | digital wireless transceiver module | 122 |
| cordless telephone | 123 | computer south bridge | 200 |
| network telephone access unit | 330 | network interface | 332 |
| network interface module | 334 | audio process module | 335 |
| normal telephone access unit | 340 | telephone interface | 341 |
| telephone interface module | 343 | wireless telephone interface | 342 |
| wireless telephone interface module | 344 | audio input and output unit | 306 |
| digital control unit | 310 | PCM module | 321 |
| wireless transceiver module | 322 | | |

DETAILED DESCRIPTION OF THE PREFERRED EMBODIMENT

Figure 1:
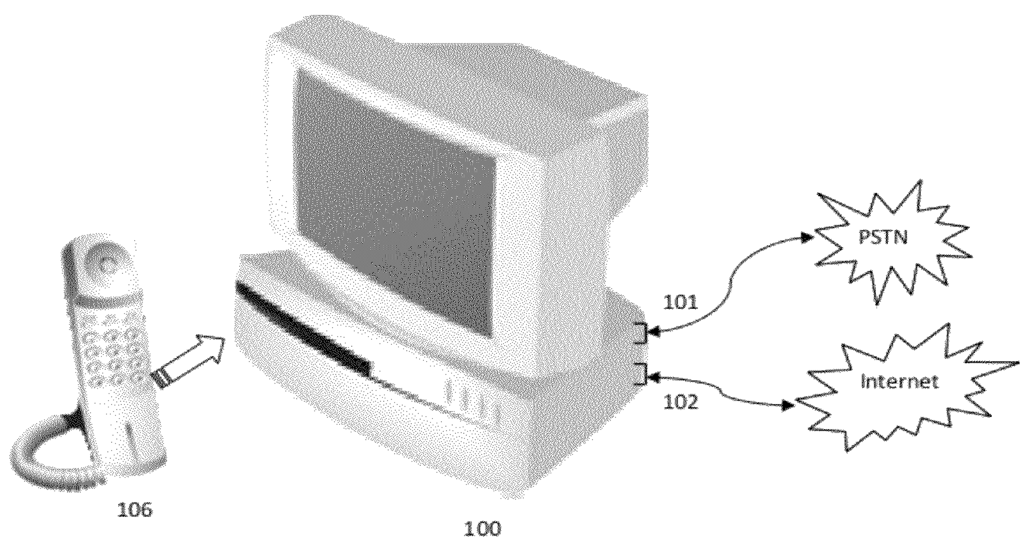
FIG. 1 is a typical connection diagram of the system according to the embodiment of the present invention.
Figure 2:
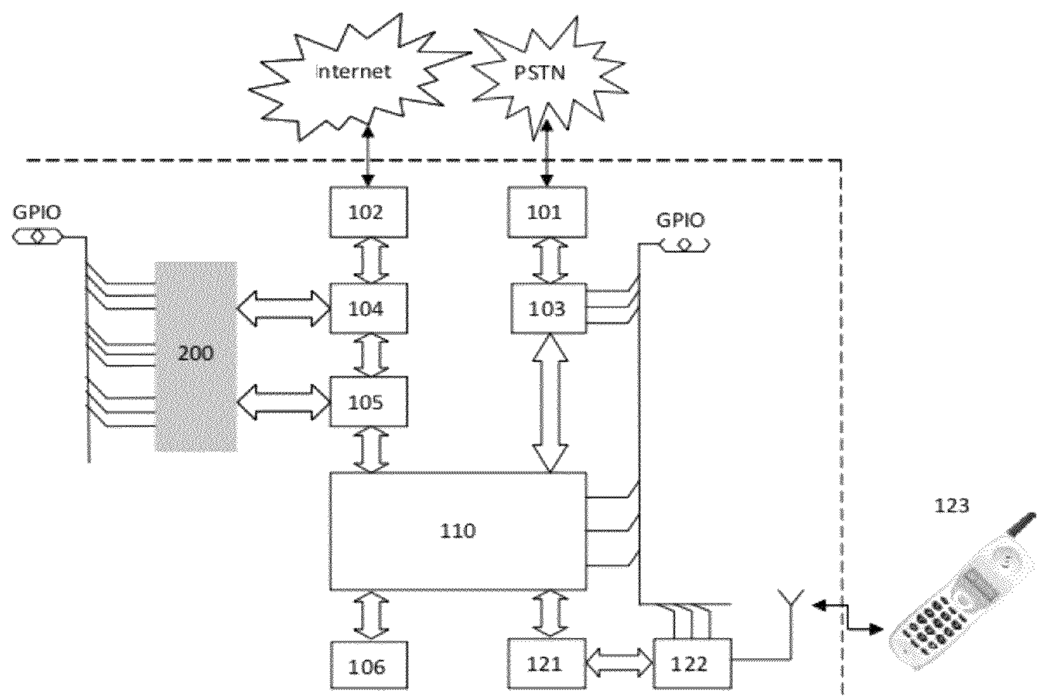
FIG. 2 is a principle block diagram according to the embodiment of the present invention.

To facilitate the description, hereinafter take FIG. 1 and FIG. 2 as examples for illustrating. As shown in the figures, the computer integrated with universal telephone functions comprises a computer body 100 and a system thereof. The computer body 100 comprises a PSTN telephone interface 101 and an internet network interface 102.

The computer further comprises a telephone interface module 103 to realize various requirements of PSTN network for the circuit interface and the signal, and meanwhile to implement the ringing, off-hook, parallel machine detection and line protection functions, etc.

The computer further comprises a telephone handle 106 with a key used for dialing calls and electro-acoustic conversion. Without commercial power, the telephone handle 106 is connected to the telephone interface module 103 directly by a digital control circuit 110, so as to be driven by the PSTN battery. As a result the calling function of the PSTN telephone still can be implemented. The computer further comprises the digital control circuit 110 and the software thereof to implement the management and switch of the network telephone and PSTN telephone, and to implement automatic conversion between each other. The IP signals from the network interface 102 are converted to audio signals by the process of both the computer network card 104 and the computer sound card 105, and then transmitted to the telephone handle 106 via the digital control circuit 110, or then transmitted to PSTN telephone interface 101 via the telephone interface module 103, or then transmitted to the digital wireless transceiver module 122 via PCM module 121, and finally sent to the cordless telephone 123 by the antenna.

With the management of the control software, the computer south bridge 200 controls the telephone interface module 103, digital control circuit 110, the wireless transceiver module 122 and so on by the GPIO bus thereof.

With the control software, the key interface of the telephone may be displayed on the computer display screen, and dialing a PSTN call and automatic telephone answering and recording can be implemented by a computer keyboard/mouse.

With the control software, the electronic document of the graph-text to be faxed is converted to the standard fax encoding formats which are then sent to the telephone line after modulation and demodulation.

As a preferred technical solution, the computer system further comprises a PCM module 121 and a wireless transceiver module 122 (that may be based on Bluetooth, 802.11, 802.16 or other digital wireless communication standards), and one or more matched or paired mobile phones 123, all of which constitute a cordless telephone communication system.

If the telephone handle 106 or the cordless telephone 123 is equipped with a camera, an internet chat with or without video can be implemented, so as to make the internet chat more in line with the usual calling habit, wherein, MSN, QQ and other internet chat tools are supported.

If a touch display screen is utilized in the cordless telephone 123, the touch display screen may be used as a wireless mouse and/or a tablet input, or as the second display screen of the computer. Users can chat or transmit and receive text messages conveniently by the cordless telephone 123.

The computer system described above involves the desktop computer, laptops and other simple personal computers.

Figure 3:
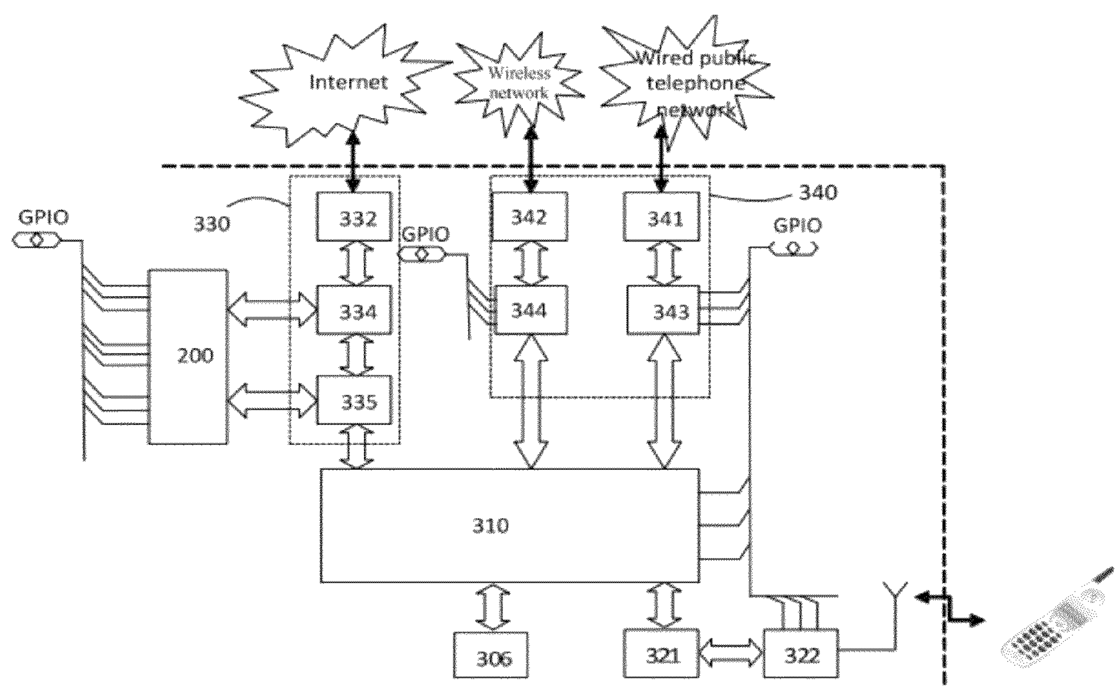
FIG. 3 is a schematic diagram according to another embodiment of the present invention.

The block diagram of the computer integrated with universal telephone functions according to the second embodiment of the present invention is shown in FIG. 3, which comprising a host computer, a network telephone access unit 330, a normal telephone access unit 340, an audio input and output unit 306 and a digital control unit 310, etc.

The host computer further comprises a computer control unit that may be the computer south bridge 200 recorded in the previous embodiment, implementing the control of the network access unit, the normal telephone access unit 340 and the digital control unit 310 by GPIO bus. It should be understood that the computer control unit may utilize other control method of the existing computer system to implement controlling.

The network telephone access unit 330 comprises a network interface 332, a network interface module 334, and an audio process module 335. The network telephone access unit 330 is connected to the internet via the network interface 332 to receive signals from the internet and transmit signals to the internet.

The network interface module 334 is connected with the network interface 332 and the audio process module 335 respectively. The network interface module 334 is used for processing signals from the side of the network interface 332, and then transmitting the audio signals thereof to the audio process module 335 and to the network interface 332, and then to the side of the internet. The network interface 332 and network interface module 334 may utilize a variety of existing network card, such as wireless and wired network card and so on.

The audio process module 335 is connected with the digital control unit 310. The audio process module 335 is used for processing the audio signals from the network interface module 334 and then transmitting them to the digital control unit 310. The audio process module 335 is further used for processing the audio signals from the digital control unit 310 and then transmitting them to the network interface module 334. The audio process module 335 may utilize a variety of existing sound cards, such as an independent sound card, an integrated sound card and so on.

The normal telephone access unit 340 comprises a wired public telephone access unit and a wireless telephone access unit. It should be understood that any one normal telephone may be set or any normal telephones may be set simultaneously.

A local telephone access unit comprises a telephone interface 341 connected with the wired public telephone network, and a telephone interface module 343 connected with the telephone interface 341 and the digital control unit 310 respectively. The telephone interface module 343 is used to build a connection with the wired public telephone network, and to transmit the audio signals from the wired public telephone network to the digital control unit 310, and to transmit the audio signals from the audio input and output unit 306 to the wired public telephone network. Furthermore, the ringing, off-hook, parallel machine detection and line protection functions of the local telephone may be implemented. It should be understood that the wired public telephone network may be PSTN telephone network, ISDN telephone network or other wired public telephone network.

A wireless telephone access unit comprises a wireless telephone interface 342 connected with the wireless telephone network, and a wireless telephone interface module 344 connected with the wireless telephone interface 342 and the digital control unit 310 respectively. The wireless telephone interface module 344 is used to build a connection with the wireless telephone network, and to transmit the audio signals from the wireless telephone network to the digital control unit 310, and to transmit the audio signals from the audio input and output unit 306 to the wireless telephone network. Furthermore, the ringing, off-hook, parallel machine detection and line protection functions of the wireless telephone may be implemented.

Furthermore, the computer also comprises a video input and output unit. The video input and output unit is connected with the digital control unit 310 to receive the video signals from the normal telephone access unit 340 or the network telephone access unit 330 for outputting, and then to transmit out the received video signals via the normal telephone access unit 340 or the network telephone access unit 330.

The audio input and output unit 306 may utilize the telephone handle connected with the digital control unit 310. The video input and output unit may combine with the telephone handle equipped with a camera and a display screen thereon.

Furthermore, the audio input and output unit 306 may also comprise a wireless audio input and output unit 306. The wireless audio input and output unit 306 comprises a PCM module 321 connected with the digital control unit 310, a wireless transceiver module 322 connected with the PCM module 321, and a wireless telephone handle wirelessly connected with the wireless transceiver module 322. Certainly, the wireless telephone handle may be provided with a camera and a display screen to implement video communication.

When electric power is supplied, the network telephone may be utilized to make calls, so as to save calling costs. Specifically, the keys set on the audio input and output unit 306 (telephone handle) are utilized for dialing, and then the dialing signals are transmitted to the network telephone access unit 330 by the digital control unit 310 to dial a call. After a communication connection with the callee is built, the audio is output by the audio input and output unit 306, and then transmitted to the digital control unit 310 by which the audio signals are transmitted to an audio process module 335 of the network telephone unit. The audio signals are processed by the audio process module 335 to be converted into digital signals which may be processed by the network interface module 334 to generate network packets for example, and then be transmitted to the callee by the network interface 332.

The network packets from the network side are accessed by the network interface 332, and the received signals are processed by the network interface module 334. The audio signals of the received signals are transmitted to the audio process unit that distributes them to the audio input and output unit 306 for playing, so as to implement calling. Certainly, video signals may be added to implement video calling.

When the electric power is cut off or a normal telephone expected to be used for calling, the local telephone access unit is accessed to the audio input and output unit 306 directly by the digital control unit 310 and then may be driven by the PSTN battery. As a result, the functions of PSTN telephone can be still implemented. Certainly, the wireless telephone unit may be accessed to the audio input and output unit 306 by the digital control unit 310 to implement the functions of the wireless telephone.

In specific applications of the present invention, technology developers may need to apply specific adjustments and change according to the circumstances. The description of the implementation of the present invention is just based on one preferred example of the present invention solutions, such that it can not be understood as limitation to the present invention solutions.

What is claimed is:

1. A computer integrated with universal telephone functions, comprising a computer body with a computer control unit, and a network telephone access unit connected with the computer control unit;

wherein the computer further comprising a normal telephone access unit, an audio input and output unit and a digital control unit the normal telephone access unit and the digital control unit are connected with the computer control unit; the normal telephone access unit comprises a telephone interface and a telephone interface module between the digital control unit and the telephone interface;

the digital control unit is connected with the network telephone access unit, the normal telephone access unit and the audio input and output unit respectively, and is used for managing and switching the network telephone access unit and the normal telephone access unit, for processing signals from the network telephone access unit or the normal telephone access unit and transmitting processed audio signals to the audio input and output unit, and for processing signals from the audio input and output unit and transmitting processed audio signals to the network telephone access unit or the normal telephone access unit;

wherein the digital control unit is configured for transmitting the audio signals from the network telephone access unit to the normal telephone access unit, and vice versa for the switching between the network telephone access unit and the normal telephone access unit.

2. The computer integrated with universal telephone functions of claim 1, wherein the normal telephone access unit comprises a local telephone access unit comprising a telephone interface connected with a wired public telephone network, and a telephone interface module connected with the telephone interface and the digital control unit respectively; wherein, the telephone interface module is used to build a connection with the wired public telephone network, and to transmit audio signals from the wired public telephone network to the digital control unit, and to transmit audio signals from the audio input and output unit to the wired public telephone network.

3. The computer integrated with universal telephone functions of claim 1, wherein the normal telephone access unit comprises a wireless telephone access unit comprising a wireless telephone interface connected with the wireless telephone network, and a wireless telephone interface module connected with the wireless telephone interface and the digital control unit respectively; wherein, the wireless telephone interface module is used to build a connection with the wireless telephone network, and to transmit audio signals from the wireless telephone network to the digital control unit, and to transmit audio signals from the audio input and output unit to the wireless telephone network.

4. The computer integrated with universal telephone functions of claim 1, wherein the network telephone access unit comprises a network interface accessing to an internet, a network interface module, and an audio process module;

wherein, the network interface module is connected with the network interface and the audio process module respectively, and is used for processing signals from the network interface side and then transmitting audio signals thereof to the audio process module, and transmitting the audio signals to the network interface;

the audio process module is connected with the digital control unit, and is used for processing audio signals from the network interface module and then transmitting processed audio signals to the digital control unit, and is used for processing audio signals from the digital control unit and then transmitting processed audio signals to the network interface module.

5. The computer integrated with universal telephone functions of claim 1, wherein the computer also comprises a video input and output unit, the video input and output unit is connected with the digital control unit and is used to receive video signals from the normal telephone access unit or the network telephone access unit for outputting, and then to transmit out the received video signals via the normal telephone access unit or the network telephone access unit.

6. The computer integrated with universal telephone functions of claim 1, wherein the audio input and output unit comprises a telephone handle connected with the digital control unit.

7. The computer integrated with universal telephone functions of claim 6, wherein the audio input and output unit also comprise a wireless audio input and output unit comprising a PCM module connected with the digital control unit, a wireless transceiver module connected with the PCM module, and a wireless telephone handle wirelessly connected with the wireless transceiver module.

8. The computer integrated with universal telephone functions of claim 2, wherein the audio input and output unit comprises a telephone handle connected with the digital control unit.

9. The computer integrated with universal telephone functions of claim 8, wherein the audio input and output unit also comprise a wireless audio input and output unit comprising a PCM module connected with the digital control unit, a wireless transceiver module connected with the PCM module, and a wireless telephone handle wirelessly connected with the wireless transceiver module.

10. The computer integrated with universal telephone functions of claim 3, wherein the audio input and output unit comprises a telephone handle connected with the digital control unit.

11. The computer integrated with universal telephone functions of claim 10, wherein the audio input and output unit also comprise a wireless audio input and output unit comprising a PCM module connected with the digital control unit, a wireless transceiver module connected with the PCM module, and a wireless telephone handle wirelessly connected with the wireless transceiver module.

* * * * *